July 15, 1969   K. E. B. KRUTZIKOWSKY   3,455,596
TRAILER BODY AND METHOD OF MAKING SAME
Filed Nov. 28, 1966   2 Sheets-Sheet 1
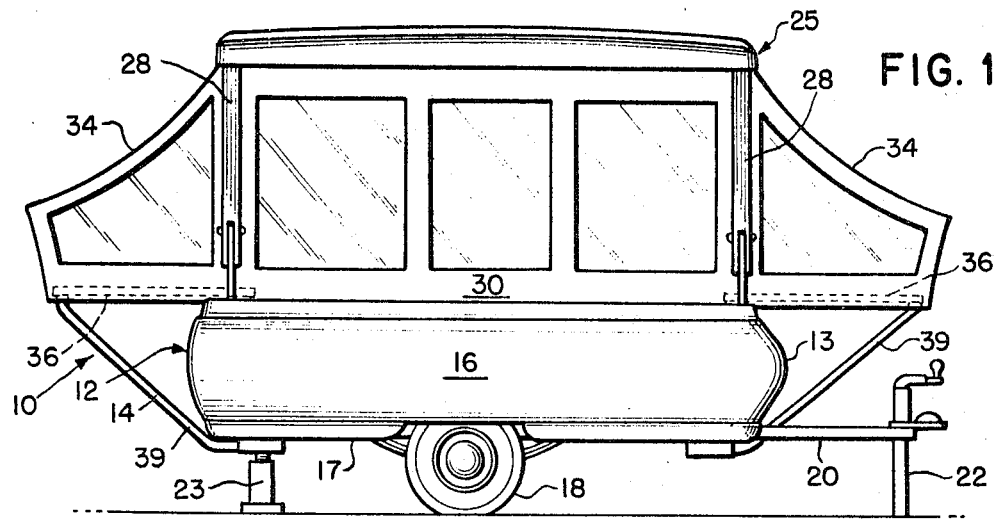
FIG. 1
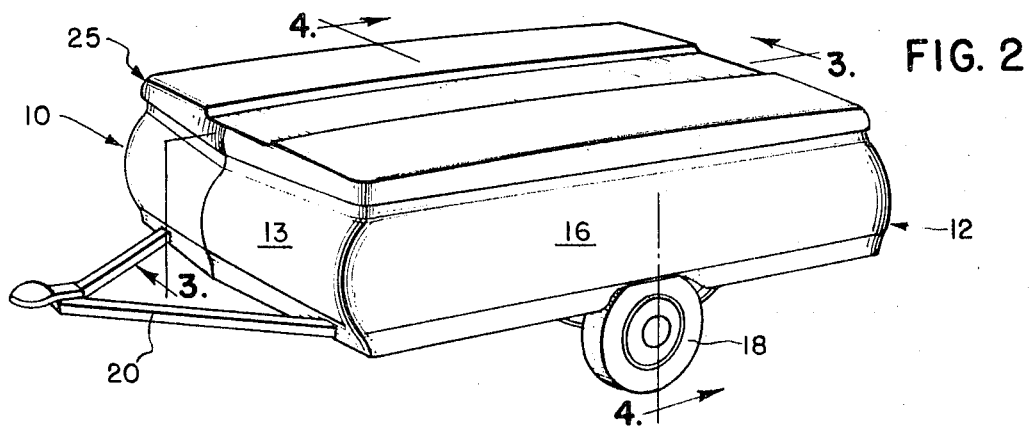
FIG. 2
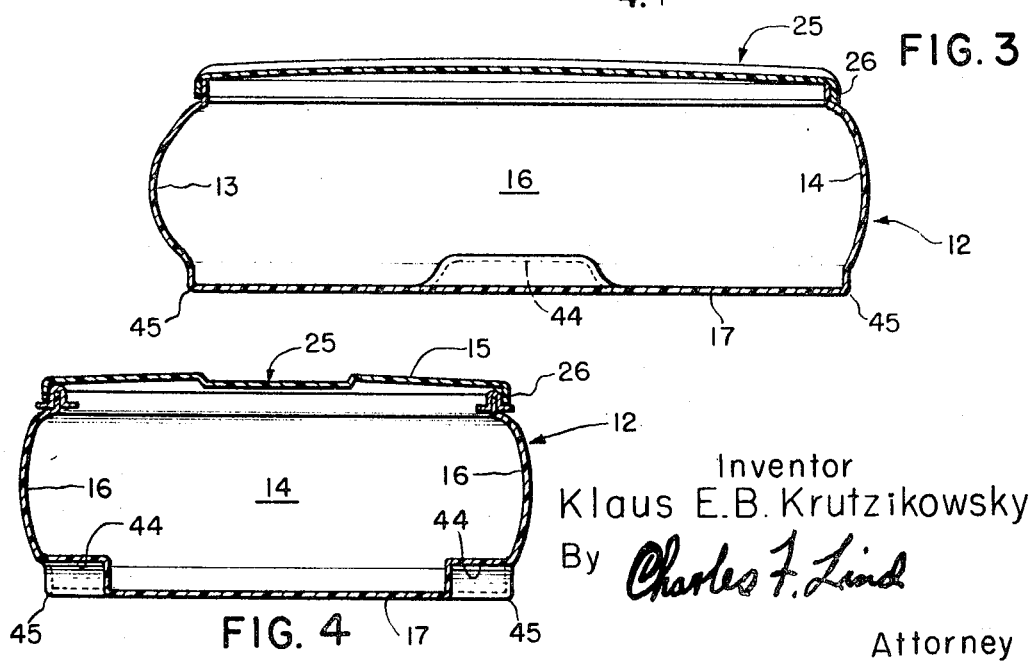
FIG. 3
FIG. 4
Inventor
Klaus E.B. Krutzikowsky
By Charles F. Lind
Attorney July 15, 1969
K. E. B. KRUTZIKOWSKY
3,455,596
TRAILER BODY AND METHOD OF MAKING SAME
Filed Nov. 28, 1966
2 Sheets-Sheet 2
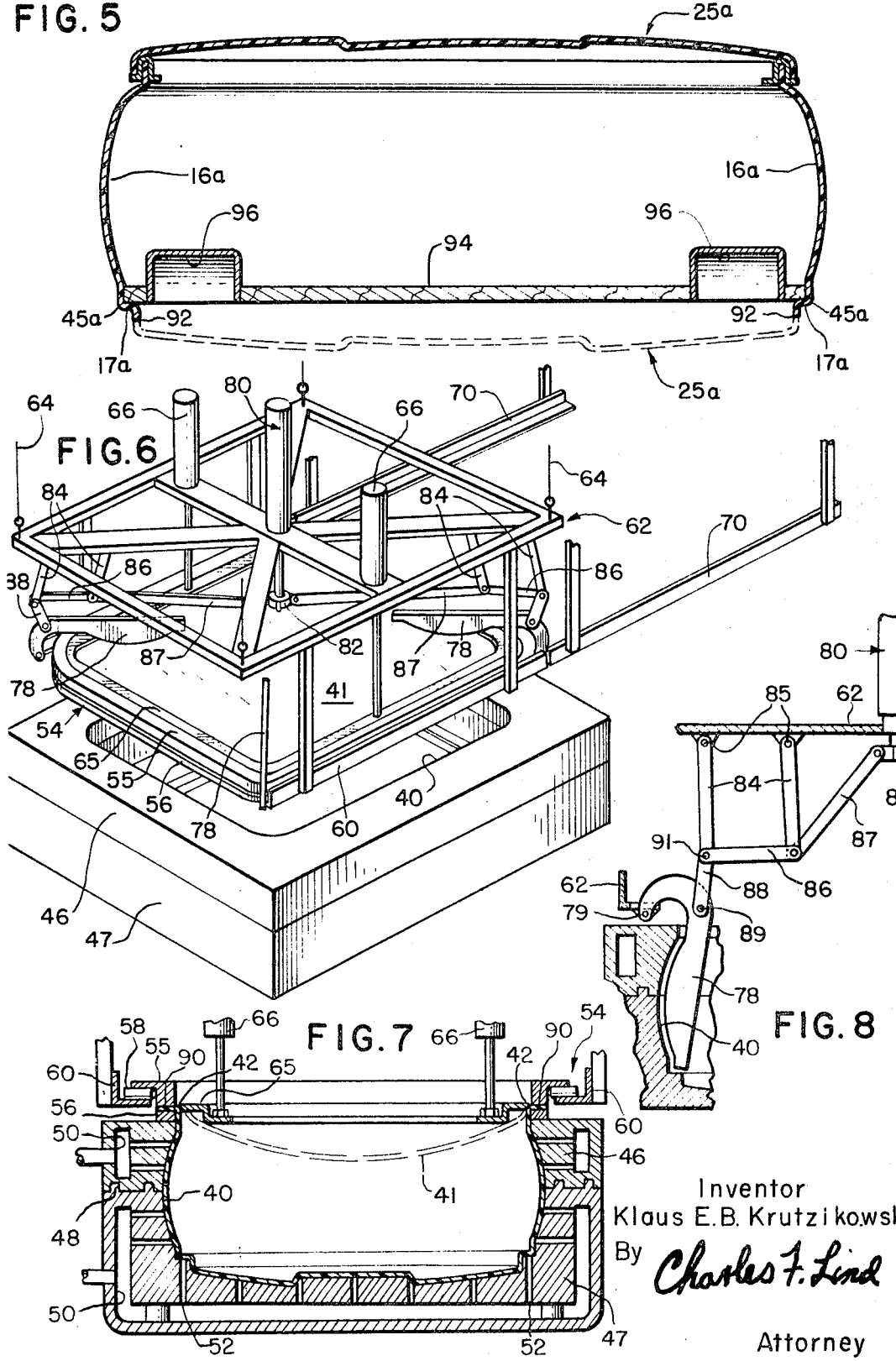
Inventor
Klaus E.B. Krutzikowsky
By *Charles F. Lind*
Attorney United States Patent Office 3,455,596
Patented July 15, 1969

3,455,596
TRAILER BODY AND METHOD OF MAKING SAME
Klaus E. B. Krutzikowsky, 4331 N. Lowell Ave., Chicago, Ill. 60641
Continuation-in-part of application Ser. No. 525,228, Feb. 4, 1966. This application Nov. 28, 1966, Ser. No. 597,364
Int. Cl. B62d 29/04
U.S. Cl. 296—31                     5 Claims

ABSTRACT OF THE DISCLOSURE

A trailer body of integral side and peripheral wall sections, formed of an acrylonitrile-butadiene-styrene. Plastic having an inner core of expandable closed cell foam and outer sandwiching layers of thermoplastic, and to a method of forming same including drawing a sheet of plastic into a complementary mold.

---

This is a continuation in part application of my copending application entitled Collapsible Trailer which was filed Feb. 4, 1966 having Ser. No. 525,228, and which will issue Nov. 29, 1966 as Patent No. 3,288,520.

This invention relates to a trailer body construction, particularly one formed from an acrylonitrile-butadiene-styrene thermoplastic having integrally interconnected vertical sidewall elements and a peripheral base section integrally connected thereto about a continuous bottom corner, and to the method of making the same.

Collapsible trailers, such as are commonly used for camping, generally include an open top body, and roof and side closure means therefor that are moveable between opened and closed positions of the trailer. The above mentioned co-pending application disclosed and claimed structure for supporting the roof and side closure means in a collapsible manner relative to the body. This invention is directed to an improved body construction that is generally lighter in weight, more durable and attractive, and as economical as comparable known prior art constructions.

Accordingly, an object of this invention is to provide an improved body construction that is light in weight, durable, and which has continuously and uniformly interconnected integral vertical sidewall elements and a horizontal peripheral base section connected thereto about a continuous corner.

Another object of this invention is to provide a body construction including body and roof elements that are molded simultaneously as a single piece and that are later separated to define the separate body and roof elements for end use in the trailer.

Another object of this invention is to provide an improved method of forming a body construction according to the previous objects, particularly by means of a mechanical assist vacuum forming construction of an acylonitrile-butadiene-styrene thermoplastic.

These and other objects will be more fully appreciated after reference to the following specification and the accompanying drawings forming a part thereof, wherein:

FIG. 1 is a side elevational view of a collapsible trailer having a preferred embodiment of the subject invention, the trailer being shown in the opened position;

FIG. 2 is a perspective view of the trailer shown in FIG. 1, except showing it in the collapsed or closed position;

FIGS. 3 and 4 are elevational sectional views as seen generally from lines 3—3 and 4—4, respectively, of FIG. 2;

FIG. 5 is a side elevational sectional view of an alternate embodiment of a trailer body forming a part of the subject invention;

FIG. 6 is a perspective view of typical molding apparatus suitable for forming the subject trailer body construction;

FIG. 7 is an elevational sectional view as seen generally from line 7—7 of FIG. 6, of the molding apparatus having a trailer body partially formed therein; and FIG. 8 is an elevational view of one mechanical assist arm used in the molding apparatus of FIGS. 6 and 7.

Certain details of construction have intentionally been omitted from certain of the views where they are adequately disclosed elsewhere.

The subject trailer 10 includes a body 12 having vertical sidewall elements including a front wall 13, rearwall 14 and opposed sidewalls 16, and having a base 17 extending horizontally across the body and connecting the lower edges of the sidewall elements. Wheels 18 are appropriately mounted on the body 12 and a drawbar 20 is secured to the body for connection to a pulling vehicle (not shown), as is well known in the art. Jack means 22 and 23 provided at the front and rear of the trailer can be extended to stabilize the trailer when it is parked. A roof 25 is supported on the trailer body in the closed position of the trailer and presents vertical side skirts 26 telescoping over the body walls to make the closed trailer weatherproof. Corner supports 28 elevate the roof vertically above the trailer body in the opened position of the trailer. Foldable water repellant material, such as canvas or nylon, is connected between the roof and body to define a trailer enclosure within the opened trailer. Bays 34 are extended off the front and rear ends of the trailer, and each bay includes a base 36 slidably supported on opposing ledges of the body and supported in the open overhanging position by angle brackets 39.

The above mentioned co-pending application teaches particular support means 28 suitable for providing collapsible support of the roof relative to the trailer body.

An important feature of the subject trailer is the body construction, particularly in regard to the material used for and the manner of forming the body. Specifically, the roof and body are formed from an A.B.S. (acrylonitrile-butadiene-styrene) thermoplastic such as the U.S. Rubber Company product having the trade name Royalex. The material is initially a laminated flat sheet consisting of an inner core of expandable closed cell foam, sandwiching layers on the core of the U.S. Rubber Company product of Royalite, and outer ultraviolet protection skin or film. The sheet 41 is shaped by vacuum within a female mold 40 (see FIGS. 6 and 7) to the contour of the trailer body, the sheet being initially sealed at 42 to the top of the mold and the vacuum then being drawn in the mold. The sheet is generally heated to approximately 300 to 350° F. and the vacuum is approximately 20 to 27 inches. A mechanical assist mechanism 43 (see FIG. 8) can be abutted directly against the sheet to help contour it flush against the mold walls, particularly in the deep draw areas.

In this manner, the body is made having continuous and integrally interconnected sidewall elements 13, 14, and 16 and having horizontal base section 17 integrally formed as continuations about the bottom corners 45 of the lower ends of the sidewall elements. This structure greatly strengthens the body for the mass of material used. Also, wheel wells 44 can be made integrally as part of the horizontal base element of the trailer. The body formed in this manner and from this plastic material is extremely lightweight although it is both structurally independent and durable against impact. Further, the body is weatherproof and can be fabricated from tinted material which then serves as the body color. If desired, the exterior can be treated by painting or buffing. Also the body can be machined such as by drilling, sawing or the like to render it particularly suitable for conventional assembly lines.

The mold 40 typically would include an upper section 46 and a lower section 47 which meet along a medial parting line or joint 48 which is at the furthest convex side contour on the body. Chambers 50 are defined by an outer wall 51 adjacent the exterior of the mold 40, and a plurality of passages 52 communicate between the chambers 50 and mold 40 to permit the drawing of vacuum from outlet pipes 53 through chambers 50 and ultimately to the mold 40. The sheet 41 is secured in a sheet frame 54, the frame including opposing clamping members 55 and 56. The upper clamping member 55 has rollers 58 mounted thereon which are adapted to roll on opposed rails 60 to bring the sheet into vertical registry over the mold. The rails 60 are supported by appropriate frame structure 62 which in turn is guided by appropriate rails (not shown) and moveable by cables 64 vertically above the mold. A seal frame 65 is supported by piston and cylinder arrangements 66 to the frame structure 62 and is thereby capable of moving relative to the sheet frame 54 and establishing a seal as at 42 of the sheet relative to the mold. Additional rails 70 aligned with rails 60 of frame 62 provide support for the sheet frame 54 in transit from the heating oven (not shown) used to heat the sheet 41 to the proper premolding temperature.

Typically, the sheet frame 54 thereby would be shifted along the rails 70 into position on the frame rails 60. The frame 62 is then lowered by the cables 64 until it is positioned vertically over the mold 40. Thereafter, the pistons 66 are energized to force the seal frame 65 downward against the sheet 41 which forms thereby the seal 42 between the sheet and mold. The mechanical assist mechanisms 43 are moved against the sheet, a vacuum is drawn in the mold 40, and the sheet thereby is forced flush against the mold to the contour of the body section.

The mechanical assist mechanism 43 includes an arm 78 supported by the frame 62 to move from above the sheet 41 against it and to force it into the deep draw areas of the mold. Preferably, a mechanism of this sort would be located at each of the four corners of the body. The pivot 79 for the arm 78 would thus be elevated above the sheet support frame 54, and the arm 78 itself would be shaped in a curved manner to permit it to be moved vertically above the frame 54 so that the frame can be rolled along rails 60 to bring the sheet 41 in place over the mold. This position is shown generally in FIG. 6.

FIG. 8 shows a typical mechanical assist mechanism 43 in its lowered position in near contact with the mold 40. The mechanisms are all powered by a piston and cylinder arrangement 80 which is supported centrally of the frame 62. A collar 82 is moved vertically relative to the frame by the piston 80, and a toggle type linkage is used to connect the collar 82 to the arm 78. The linkage includes links 84 pivoted at 85 to the frame 62, a link 86 pivotally connected between the links 84, and another link 87 between one link 84 and the collar 82. Link 88 connects the arm 78 at the pivot 89 and the linkage at pivot 91.

By proper geometry of the arm 78 and the linkage, a downward movement of the piston 80 and thus the collar 82 (as seen in FIG. 6) would pivot the links 84 in a clockwise direction and in turn pivot the arm 78 in a counterclockwise direction about its pivot 79 to the frame 62. The relatively short distance between the pivots 79 and 89 on the arm 78 and the toggle condition of the link 88 cause a rather large angular arm rotation about the pivot 79 for relatively short travel of the piston 80 and collar 82 to completely lift the arm 78 out of the way above the sheet frame 54, while still forcing the arm 78 with a large assist force against the sheet 41.

After the molded piece has cooled sufficiently and hardened, the top flange 90 can be severed to permit the elevation and removal of the sheet frame 54. The upper and lower mold sections can then be separated from one another in an appropriate manner and the molded piece removed from the molds from between the parting line 48.

Another aspect of this invention is the particular technique used for forming a body element and a removeable roof element therefor from a one piece molded part. This construction is disclosed in FIG. 5. Note that the actual contour of the body has the roof telescope over the upper perimeter of the body to offer a weatherproof construction. Moreover, the body can be suitably dimensioned so that the lower peripheral edge of the sidewall elements has a shape generally similar to but larger than the upper peripheral contour. Therefore, the subject technique permits both the body and the collapsible telescoping roof therefor to be formed from a single molded piece simultaneously.

FIG. 5 shows this construction and includes that the lower edge of the sidewall 16a curve about the corners 45a and extend inwardly in a horizontal direction to provide thereby a continuous peripheral base ledge 17a. This ledge 17a is integral with the adjacent sidewall and with the adjacent ledge and is thereby continuous about the lower edge of the body sidewall. The mold is then curved downwardly the distance required to form the telescoping roof section 25a for the body and thereafter is curved inwardly in a horizontal direction in a reverse contour to the roof contour. A single sheet drawn into the mold thus forms simultaneously the body and roof elements. Thereafter, the body and roof elements can be separated along a separation area 92 generally designated. This provides that the lower section of the molded piece can be inverted and used as the roof element for the body and telescoped over the vertical peripheral section thereof.

A separate horizontal base member 94 is then used for the trailer body, the separate element being supported by the integral peripheral base element 17a of the body and being secured thereto in an appropriate manner such as by means of screws (not shown). Appropriate wheel wells 96 can be formed from separate shell elements and can be secured to the base.

What is claimed is:

1. In a trailer body construction, the improvement comprising a unitary body having opposed pairs of substantially vertical front, rear, and side wall sections integral with one another at the respective end edges thereof, substantially horizontal peripheral base sections extending inwardly from the respective front, rear and side wall sections at the lower edges thereof, the vertical and horizontal sections being integral and continuous with one another across the corner sections, said sections being formed from acrylonitrile-butadiene-styrene plastic and each having an inner core of expanded closed cell foam and outer sandwiching layers of thermoplastic, and a roof having a top and having front, rear and side skirts integral and continuous at the corners and comprised of the same material as the body and adapted to telescope over the top edges of the corresponding front, rear and side wall sections of the body.

2. A body construction according to claim 1, wherein the roof is initially formed integrally with the body as a continuation of the base sections, wherein the front, rear and side skirts of the roof are separated at their free end edges from the inner edges of the horizontal base sections.

3. A body construction according to claim 2, wherein a separate central base section is connected to the peripheral bottom wall sections and extends across and closes the bottom of the body.

4. A body construction according to claim 1, wherein a central base section is integral with the horizontal peripheral base sections and is formed as integral continuations thereof, and wherein the central base section extends across and closes the bottom of the body.

5. In a trailer body construction, the combination of opposed pairs of side wall sections integral with one another at the respective adjacent edges thereof, peripheral base sections integral with and extending inwardly from the side wall sections at lower and end edges thereof and defining an opening, a separate base element lapping the peripheral base sections and being secured thereto to close the opening, a removable roof having a central section and side skirt sections extending at sharp angles therefrom and being larger than the upper end edges of the side wall sections and adapted to telescope over said side wall sections, and the roof being smaller than the base element and being initially integral with the base sections but separated therefrom to create the said opening during fabrication of the body construction.

References Cited
UNITED STATES PATENTS

| | | | |
|---|---|---|---|
| 3,070,817 | 1/1963 | Kohrn. | |
| 3,161,433 | 12/1964 | Markel | 296—27 |
| 3,123,393 | 3/1964 | Markwick | 296—31 X |
| 3,084,973 | 4/1963 | Beckley | 296—31 |

PHILIP GOODMAN, Primary Examiner

U.S. Cl. X.R.

52—309; 161—254